United States Patent
Thamboo et al.

(10) Patent No.: US 8,557,063 B2
(45) Date of Patent: Oct. 15, 2013

(54) METHOD FOR HEAT TREATING SERVICED TURBINE PART

(75) Inventors: Samuel V. Thamboo, Latham, NY (US); Ling Yang, Niskayuna, NY (US)

(73) Assignee: General Electric Company, Schenectady, NY (US)

(*) Notice: Subject to any disclaimer, the term of this patent is extended or adjusted under 35 U.S.C. 154(b) by 1497 days.

(21) Appl. No.: 11/327,237

(22) Filed: Jan. 5, 2006

(65) Prior Publication Data
US 2007/0151100 A1 Jul. 5, 2007

(51) Int. Cl.
*C21D 8/00* (2006.01)
*C21D 9/00* (2006.01)
*B21K 25/00* (2006.01)
*F01D 5/02* (2006.01)

(52) U.S. Cl.
USPC ............ 148/559; 416/244 A; 29/889.23

(58) Field of Classification Search
USPC ............ 148/559; 29/889.23; 416/244 A
IPC ......................................... C29D 9/28
See application file for complete search history.

(56) References Cited

U.S. PATENT DOCUMENTS

| | | | |
|---|---|---|---|
| 4,253,885 A | 3/1981 | Maurer et al. | |
| 4,957,567 A | 9/1990 | Krueger et al. | |
| 5,080,734 A | 1/1992 | Krueger et al. | |
| 5,111,570 A * | 5/1992 | Baumgarten et al. | 29/402.13 |
| 5,143,563 A | 9/1992 | Krueger et al. | |
| 5,161,950 A * | 11/1992 | Krueger et al. | 416/204 R |
| 5,359,770 A * | 11/1994 | Brown et al. | 29/889.1 |
| 5,393,483 A | 2/1995 | Chang | |
| 5,413,752 A | 5/1995 | Kissinger et al. | |
| 5,584,947 A | 12/1996 | Raymond et al. | |
| 6,908,518 B2 | 6/2005 | Bouse et al. | |
| 6,974,508 B1 | 12/2005 | Gabb et al. | |
| 7,051,435 B1 | 5/2006 | Subramanian et al. | |
| 7,138,020 B2 | 11/2006 | Groh et al. | |

FOREIGN PATENT DOCUMENTS

| | | |
|---|---|---|
| EP | 0024911 A1 | 11/1981 |
| EP | 1486286 A2 | 12/2004 |
| JP | 57120619 | 7/1982 |
| JP | 2001055928 A * | 2/2001 |
| KR | 10-0504381 * | 7/2005 |
| RU | 2190686 C2 | 10/2002 |

OTHER PUBLICATIONS

ASM handbooks online. Heat Treating of Superalloys. "Wrought Superalloy Heat Treatment" Daniel A. DeAntonio, 2002.*
EPO Search, Application # 07100068.1, May 14, 2007.
XP-002433575 & KR 100 504 381 B, Database WPI, Section Ch, Week 200671, Derwent Publications Ltd., London, GB, Jul. 27, 2005,Class M23, AN 2006-684162, 2 Pages.

* cited by examiner

*Primary Examiner* — Keith Walker
*Assistant Examiner* — Alexander Polyansky
(74) *Attorney, Agent, or Firm* — Armstrong Teasdale LLP

(57) ABSTRACT

A method for heat treating a serviced turbine part to improve a hold time fatigue cracking resistance of the serviced turbine part is provided. The method includes positioning the serviced turbine part in a vacuum furnace configured to limit surface oxidation. The serviced turbine part is controllably heated to prevent distortion. A surface damage layer is recrystallized into a fine grain structure to prevent fatigue crack initiation. The serviced turbine part is controllably cooled to prevent distortion.

18 Claims, 3 Drawing Sheets

METHOD FOR HEAT TREATING SERVICED TURBINE PART

BACKGROUND OF THE INVENTION

This invention relates generally to heat treatment of serviced turbine parts and, more particularly, to a method for extending the useful life of a serviced turbine part.

Gas turbine engines operate at high temperatures and high stresses. Gas turbine components or parts, including, without limitation, rotor disks having wheels and spacers, are subjected to high temperatures and high stresses. The turbine parts are frequently inspected to ensure that cracking is not present in the parts. Cracking may result from one or more mechanisms, such as hold time fatigue cracking. Hold time fatigue cracking occurs as a result of extended in-service hours at high temperatures and/or high stresses and is common among nickel-based alloys, such as Alloy 706. Alloy 706 is a nickel-based superalloy used for high temperature applications in gas turbine engines. Such hold time fatigue cracking may severely reduce the service life of the gas turbine rotor disks.

The hold time fatigue cracking initiates at a surface of the part. Conventional remedies for reducing hold time fatigue cracking include applying compressive residual stresses to the surface using a suitable method such as shot peening. By providing surface compressive residual stresses, the net stress on the surface can be significantly reduced to prevent cracking. However, if the shot peening does not cover the entire surface, cracks may initiate at locations inadequately peened. In addition, any damage on the surface during handling can cause crack initiation at such locations. Once the crack is initiated microscopically, the crack may propagate rapidly and make the part unusable.

Another conventional remedy for reducing hold time fatigue cracking includes frequently inspecting the parts using non-destructive techniques. This approach requires the gas turbine to be shut down, cooled and partially dissembled to provide access to critical areas for inspection. The obvious disadvantage to this remedy is the required shut down time and the significant time loss. Further, detection of microscopic cracks by non-destructive methods is difficult and unreliable. Macroscopic or larger cracks may also be missed in locations difficult to access. The rapid propagation rate of these cracks may cause failure before the next scheduled inspection. One solution to this problem is to reduce the scheduled inspection intervals so cracks are more reliably detected. However, frequent shut down for inspection purposes is highly undesirable for power production turbines, for example. Another alternative approach is to estimate the life of each turbine part based upon material properties and/or exposure to stresses and high temperatures, and retire the part after a determined service time. This approach is currently applied to aircraft engine turbines, where some mandates are in place for how long a turbine part can be used. Such a solution applied to power generation turbines is not desirable because of the cost involved.

BRIEF DESCRIPTION OF THE INVENTION

In one aspect, the present invention provides a method for heat treating a serviced turbine part to improve a hold time fatigue cracking resistance of the serviced turbine part. The method includes positioning the serviced turbine part in a vacuum furnace configured to limit surface oxidation. The serviced turbine part is controllably heated to prevent distortion. A surface damage layer is recrystallized into a fine grain structure to prevent fatigue crack initiation. The serviced turbine part is controllably cooled to prevent distortion.

In another aspect, a method for heat treating a serviced turbine rotor disk to improve hold time fatigue crack growth resistance is provided. The method includes positioning the serviced turbine rotor disk in a vacuum furnace configured to prevent surface oxidation. A heating rate to a peak heat treatment temperature is controlled to minimize a temperature difference between an outer surface of the serviced turbine rotor disk and an interior region of the serviced turbine rotor disk.

In another aspect, a method for heat treating a serviced turbine rotor disk to improve hold time fatigue crack growth resistance is provided. The method includes heating the serviced turbine rotor disk at a rate of about 2° F./min. to about 4° F./min. to a first holding temperature of about 1100° F. The serviced turbine rotor disk is stabilized at the first holding temperature for a period of about 1 hour to about 3 hours. The serviced turbine rotor disk is heated at a rate of about 2° F./min. to about 4° F./min. to a second holding temperature of about 1500° F. The serviced turbine rotor disk is stabilized at the second holding temperature for a period of about 1 hour to about 3 hours. The serviced turbine rotor disk is heated at a rate of about 2° F./min. to about 4° F./min. to a peak heat treatment temperature of about 1750° F. to about 1900° F.

DETAILED DESCRIPTION OF THE INVENTION

Figure 1:
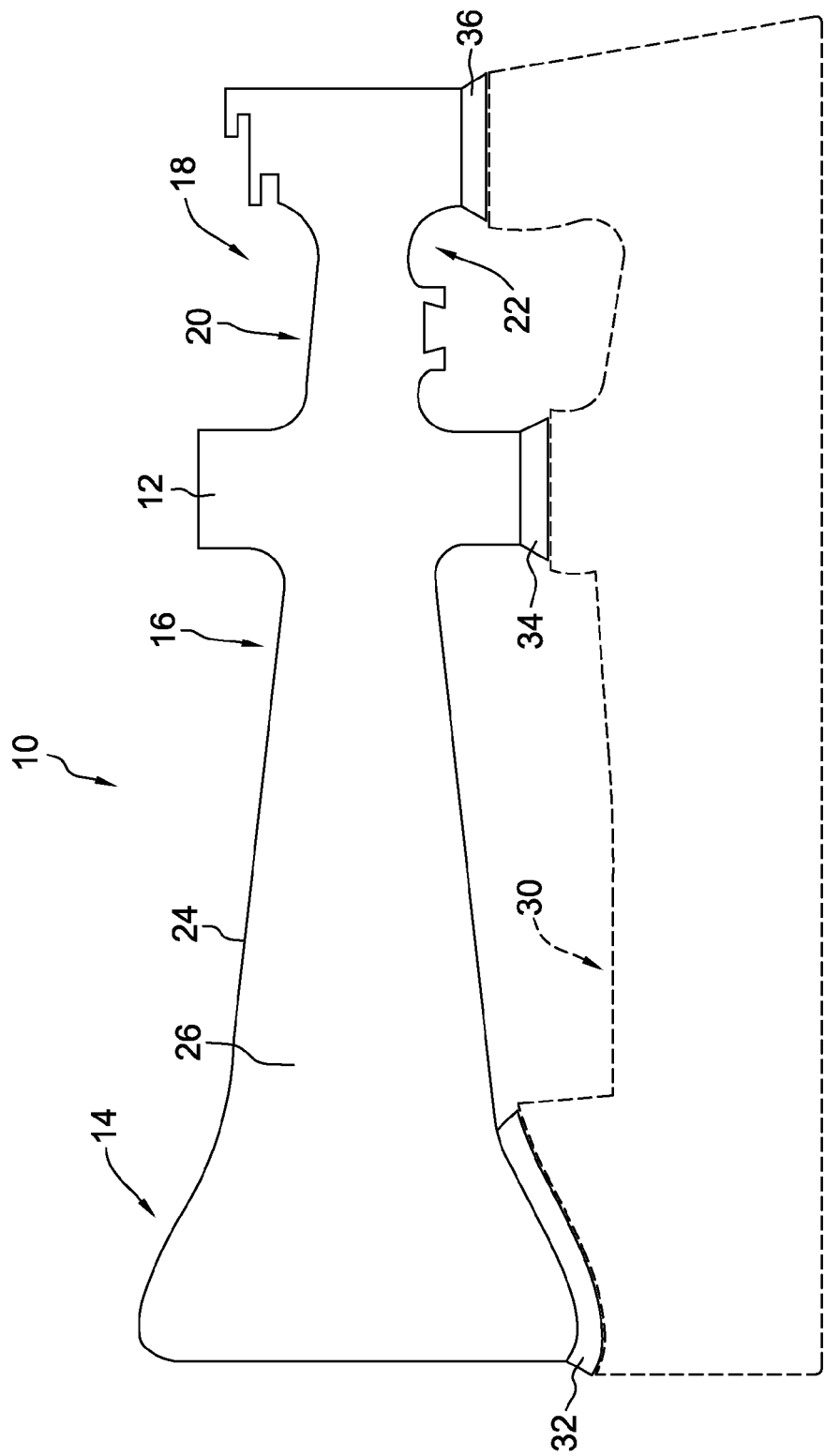
FIG. 1 is a sectional view of an exemplary serviced turbine rotor disk suitable for heat treatment according to the present invention.

The present invention provides a method for extending the useful life of a serviced turbine rotor component or part. The method includes a heat treatment process that is applied to a fully-machined, serviced turbine part without causing any damage and/or distortion to the part. The method of the present invention may be used for extending the useful life of any suitable turbine rotor component or part.

The present invention is described below in reference to its application in connection with and operation of a serviced turbine part and, specifically, to a serviced turbine rotor disk. However, it will be obvious to those skilled in the art and guided by the teachings herein provided that the invention is likewise applicable to any suitable machined, serviced component or part including, without limitation, other components or parts of a turbine engine, a boiler and a heater, and may be applied to systems consuming natural gas, fuel, coal, oil or any solid, liquid or gaseous fuel.

As used herein, references to "serviced" are to be understood to refer to a turbine part, such as a turbine rotor disk, that has been incorporated into an operating turbine engine and has a service time, in many cases, of at least several thousand hours.

The present invention provides a heat treatment method for changing a microstructure of a serviced turbine part to prevent cracking including, without limitation, hold time fatigue cracking. Hold time fatigue cracking involves an initiation phase and a propagation phase. The initiation phase may take multiple thousands of in-service hours. During the initiation phase, no crack is formed but there is damage accumulation to the outer surface of the material. A rate of damage accumulation depends on the stresses, operating temperatures, surface residual stresses, presence of surface damage due to handling and/or machining processes, grain size of the surface and/or cycles of operation. Once the damage has reached a critical level, small microscopic cracks initiate at the outer surface of the turbine part. These cracks may propagate rapidly through the turbine part. In one embodiment, the heat treatment method of the present invention repairs damage that has occurred and/or accumulated on the outer surface the turbine part. Further, the method alters the surface microstructure to a finer grain structure thereby reducing the tendency for crack initiation during service. Additionally, the method changes the grain structure of the entire part to a new microstructure, which has a high resistance to crack propagation. Heat treatment of fully machined parts is not an easy task as there is a natural tendency for distortion when machined parts are heated to very high temperatures. In addition, surface oxidation also takes place making the surface unacceptable for use.

During the heating process wherein the temperature of the serviced turbine part approaches the peak heat treatment temperature, these stresses will relax. If the heating rate is too fast, regions of the serviced turbine part, such as an outer surface, may relax faster than other regions, such as an interior region, which results in distortion of the serviced turbine part. In one embodiment, a thermal analysis is conducted to determine the optimum heating rate to minimize the temperature difference between the outer surface and the interior region.

As shown in FIG. 1, a serviced turbine part 10, such as a serviced turbine rotor disk 12, is shown in cross-section, and illustrates the complex shape that requires specialized heat treatment. The shape varies from a relatively thick radially inner portion 14 that is radially adjacent a rotor bore (not shown), through an intermediate portion 16 of decreasing thickness, to a radially outer portion 18 that is generally thinner than inner portion 14 but with variations indicated at 20 and 22, for example.

In arriving at the heat treatment process of the present invention, the above described geometry is taken into account, recognizing that outer portion 18 and surfaces thereof remain at a stabilization temperature for a longer period than inner portion 14 near the rotor bore. Further, an outer surface 24 of serviced turbine rotor disk 12 heats and/or cools at a heating rate and a cooling rate, respectively, greater than a rate at which an interior region 26 of serviced turbine rotor disk 12 heats and/or cools. Serviced turbine rotor disk 12 may be rapidly heated or cooled from a stabilization or holding temperature before serviced turbine rotor disk 12 achieves a uniform temperature throughout. In other words, after stabilization, outer surface 24 experiences the holding temperature for a longer period than interior region 26 because of slow conduction of heat through serviced turbine rotor disk 12. Further, radially outer portion 18 may experience the holding temperature for a longer period than radially inner portion 14 because of cross-sectional size differences and slow conduction of heat through serviced turbine rotor disk 12.

Figure 2:
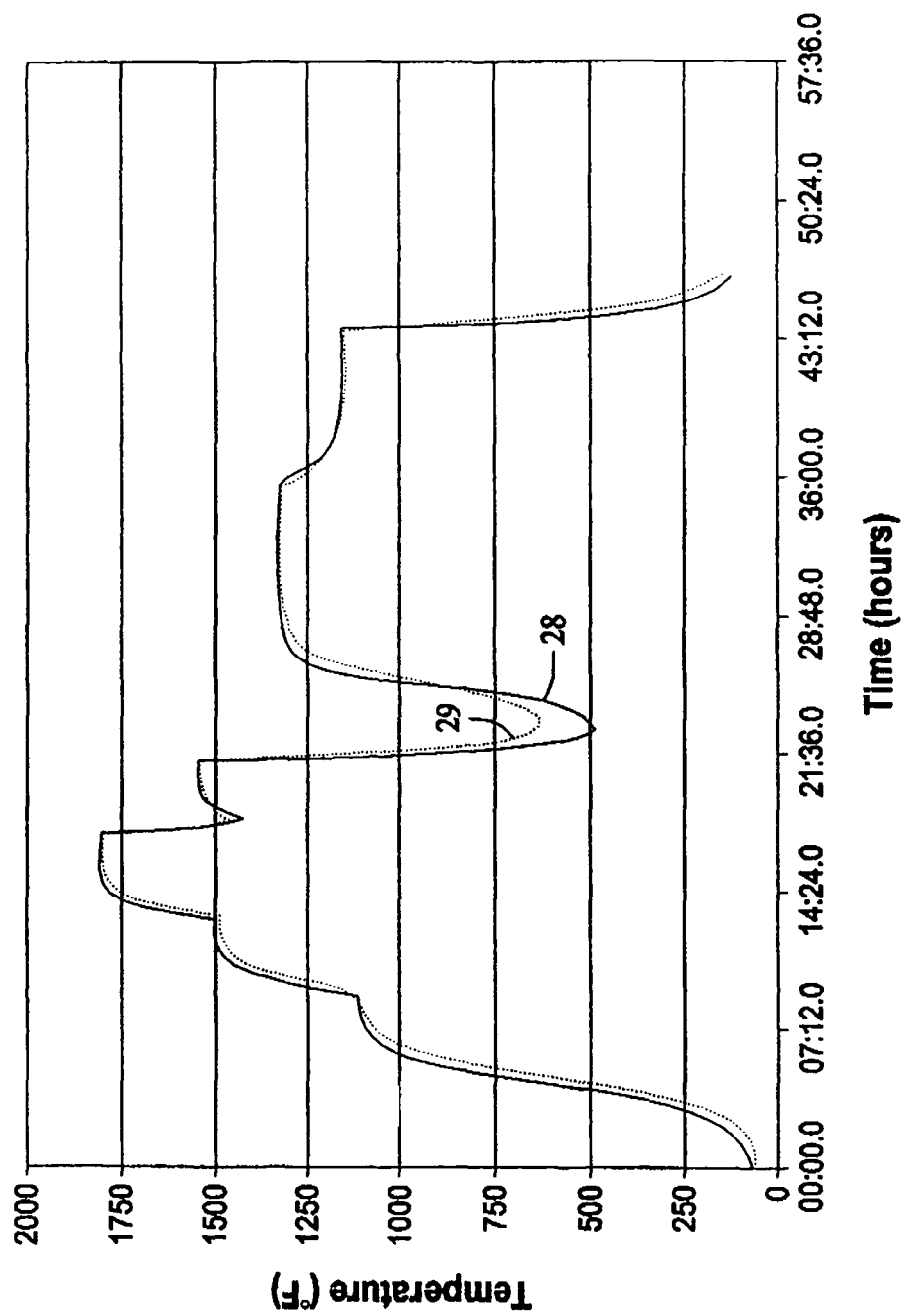
FIG. 2 is a graphical representation of an exemplary heat treatment cycle.
Figure 3:
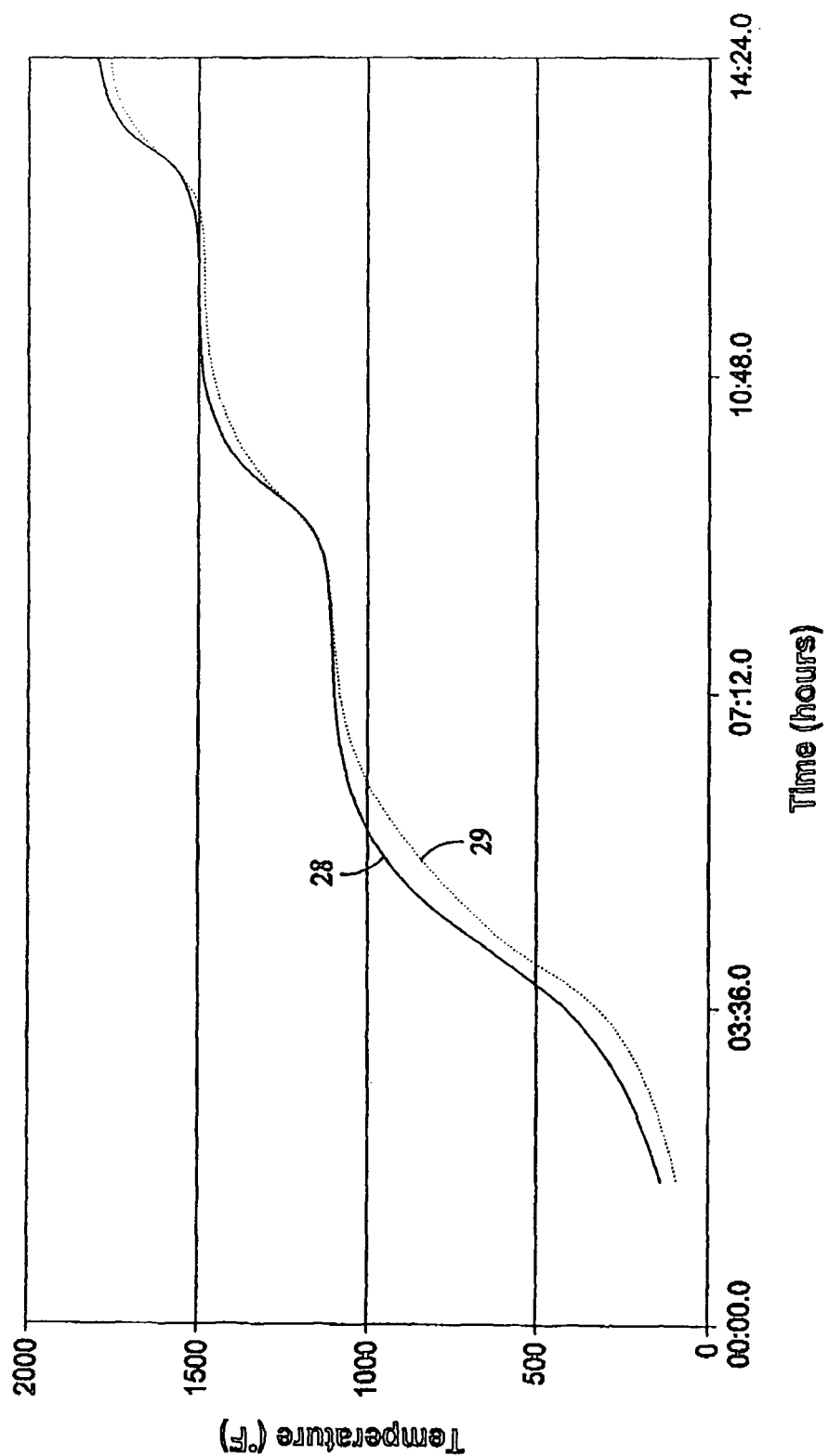
FIG. 3 is a graphical representation of a controlled heating portion of the heat treatment cycle shown in FIG. 2.

Referring further to FIGS. 2 and 3, the present invention provides a method for heat treating a serviced turbine part, such as a serviced turbine rotor disk, to improve hold time fatigue crack growth resistance of serviced turbine part 10 and/or increase a life expectancy of serviced turbine part 10. As shown in FIGS. 2 and 3, a temperature of outer surface 24 of serviced turbine part 10 during a heat treatment cycle is represented by a curve 28 and a temperature of interior region 26 of serviced turbine part 10 during the heat treatment cycle is represented by a curve 29. Serviced turbine part 10 is positioned within a vacuum furnace (not shown) configured to prevent or limit surface oxidation. Surface oxidation may prevent or limit the effectiveness of the heat treatment method, described herein. In one embodiment, serviced turbine part 10 is supported within the vacuum furnace to prevent or minimize sagging and/or distortion of serviced turbine part 10 when subjected to the high temperatures associated with the heat treatment method. As shown in FIG. 1, serviced turbine rotor disk 12 is positioned within the vacuum furnace and supported with a support 30 at at least one location including, without limitation, at a bore region 32, a bolt aperture region 34 and/or a rim region 36 of serviced turbine rotor disk 12. In this embodiment, support 30 is made of a material having a low coefficient of thermal expansion and/or a coefficient of thermal expansion similar or identical to a coefficient of expansion of serviced turbine rotor disk 12. In alternative embodiments, support 30 is fabricated of any suitable material known to those skilled in the art and guided by the teachings herein provided that is configured to sufficiently support serviced turbine part 10 during the heat treatment method.

By supporting serviced turbine rotor disk 12 at locations 32, 34 and/or 36, for example, the stresses due to a weight of serviced turbine rotor disk 12 will be prevented from causing sagging of serviced turbine rotor disk 12 when serviced turbine rotor disk 12 approaches or reaches a peak heat treatment temperature, as described below. In one embodiment, an optimal support is determined by comparing the stresses due to the weight of the serviced turbine part to the flow stresses of the alloy material comprising serviced turbine rotor disk 12 at a maximum heat treatment temperature. Support 30 facilitates reducing the stresses to below the flow stresses of the alloy material at the peak heat treatment temperature. Further, in addition to distortion due to the part weight, a fully machined, serviced turbine rotor disk 12 may distort due to residual stresses in serviced turbine rotor disk 12. These residual stresses may result from machining exposure and/or operating exposure. Additionally, conventional heating processes may cause distortion as outer surface 24 and interior regions 26 are at different temperatures during the heating process.

Serviced turbine part 10 is controllably heated to prevent distortion. In one embodiment, a heating rate is controlled by stabilizing serviced turbine part 10 at a series of intermediate holding temperatures. In a particular embodiment, heated serviced turbine part 10 is stabilized at a series of intermediate holding temperatures for a time period of about 1 hour to about 3 hours. In alternative embodiments, the holding temperatures and/or the holding times may vary depending on the geometry of serviced turbine part 10.

Referring to FIGS. 2 and 3, a heating rate to a peak heat treatment temperature is controlled to minimize a temperature difference between outer surface 24 and interior region 26. In one embodiment, serviced turbine part 10 is controllably heated to a first holding temperature of about 1000° F. to about 1100° F. at a rate of about 2° F./min. to about 4° F./min. At the first holding temperature, serviced turbine part 10 is stabilized for a time period of about one hour to about three hours to equalize a temperature of outer surface 24 and a temperature of interior region 26. Temperature stabilization at the first holding temperature allows the temperature within serviced turbine part 10 to reach equilibrium and prevents distortion of serviced turbine part 10 upon further heating of serviced turbine part 10.

Serviced turbine part 10 is then controllably heated to a second holding temperature of about 1500° F. to about 1600° F. at a rate of about 2° F./min. about 4° F./min. At the second holding temperature, serviced turbine part 10 is again stabilized for a time period of about one hour to about three hours to equalize a temperature of outer surface 24 and a temperature of interior region 26 of serviced turbine part 10. Temperature stabilization at the second holding temperature allows the temperature within serviced turbine part 10 to reach equilibrium and prevents distortion of serviced turbine part 10 upon further heating of serviced turbine part 10.

In one embodiment, serviced turbine part 10 is heated to a peak heat treatment temperature of about 1750° F. to about 1900° F. at a rate of about 2° F./min. to about 4° F./min. In a particular embodiment, serviced turbine part 10 is heated to a peak heat treatment temperature of about 1800° F. Serviced turbine part 10 is stabilized at the peak heat treatment temperature for about 3 hours to about 10 hours to facilitate recrystallization of damaged portions and/or areas of serviced turbine part 10. Damage accumulation resulting from exposure to operating conditions during service time is repaired or reconditioned at the peak heat treatment temperature. In one embodiment, at least a portion of a surface damage layer (not shown) is repaired at the peak heat treatment temperature. In this embodiment, the surface damage layer is recrystallized into a fine grain structure to prevent fatigue crack initiation. A fine grain structure can be defined as a structure having grain sizes of about ASTM Grain Size number 6 or higher. The grain size of the remaining portions of the part will remain at about the original level, and has a grain size of about ASTM Grain Size number 2 to about 4. Further, at the peak heat treatment temperature, a solution of precipitates is present for subsequent heat treatment. Upon recrystallizing the surface damage layer, serviced turbine part 10 is controllably cooled to prevent distortion.

In one embodiment, serviced turbine part 10 is cooled at a rate of about 15° F./min. to about 30° F./min. to a third holding temperature of about 1500° F. to about 1600° F. Serviced turbine part 10 is stabilized at the third holding temperature for a period of about two hours to about six hours to equalize a temperature of outer surface 24 and a temperature of interior region 26. Allowing the temperature within serviced turbine part 10 to reach equilibrium prevents or limits distortion of serviced turbine part 10 upon further cooling of serviced turbine part 10.

In one embodiment, serviced turbine part 10 is further cooled at a rate greater than about 300° F./hr. to a temperature less than about 100° F. Cooling to this temperature prevents or limits premature precipitation of desirable phases, which occurs during subsequent processing. After cooling serviced turbine part 10 to a temperature less than 1000° F., serviced turbine part 10 is heated at a rate of about 2° F./min. to about 10° F./min. to an aging temperature of about 1300° F. to about 1350° F. In this embodiment, the temperature difference between outer surface 24 and interior region 26 is not sufficiently large to require an intermediate holding time during the subsequent heating to the aging temperature of about 1300° F. to about 1350° F. Further, the alloy material is at an as-solutioned state, which for nickel-based alloys is a relatively soft condition that is unlikely to crack. Serviced turbine part 10 is stabilized at the aging temperature for a period of about eight hours to about twelve hours to facilitate reconditioning or repairing serviced turbine part 10. A period of about eight hours provides a sufficient time for the precipitation of the desirable strengthening precipitates. The longer time of about twelve hours may be required for larger parts to heat the entire part to the aging temperature.

After serviced turbine part 10 is stabilized at the aging temperature, serviced turbine part 10 is controllably cooled. In one embodiment, serviced turbine part 10 is cooled at a rate of about 100° F./hr. for a period of about two hours to a fourth holding temperature of about 1125° F. to about 1150° F. Serviced turbine part 10 is stabilized at the fourth holding temperature for a period of about eight hours to about twelve hours. The period of about eight hours provides a sufficient time for the precipitation of the desirable strengthening precipitates. However, the longer time of about twelve hours may be required for larger parts to equalize a temperature of outer surface 24 and a temperature of interior region 26 and allow the temperature within serviced turbine part 10 to reach equilibrium. After stabilization at the fourth holding temperature, serviced turbine part 10 is cooled to a room temperature. In one embodiment, serviced turbine part 10 is removed from the vacuum furnace and allowed to air cool to room temperature. In an alternative embodiment, serviced turbine part 10 is cooled to room temperature within the vacuum furnace.

The above-described method for heat treating a serviced turbine part facilitates extending a service life of a serviced turbine part, such as a serviced turbine rotor disk, in a cost-effective and reliable manner. More specifically, the method facilitates extending a fatigue crack growth resistance of the serviced turbine part, such as a serviced turbine rotor disk, without distortion and without negatively affecting the material properties. As a result, serviced turbine parts can be reliably and efficiently heat treated to make the serviced turbine part damage tolerant, e.g., the method repairs or reconditions the entire serviced turbine part.

Exemplary embodiments of a method for heat treating a serviced turbine part are described above in detail. The method is not limited to the specific embodiments described herein, but rather, steps of the method may be utilized independently and separately from other steps described herein. Further, the described method steps can also be defined in, or used in combination with, other methods, and are not limited to practice with only the method as described herein.

While the invention has been described in terms of various specific embodiments, those skilled in the art will recognize that the invention can be practiced with modification within the spirit and scope of the claims.

What is claimed is:

1. A method for heat treating a turbine part, said method comprising:

positioning a serviced turbine part, prior to crack initiation, and including a surface damage layer, in a vacuum furnace configured to limit surface oxidation, wherein the surface damage layer includes the outermost surface of the turbine part, and wherein positioning the turbine part comprises positioning the turbine part in contact with a support configured to facilitate preventing distortion of the turbine part;

controllably heating the turbine part to a peak heat treatment temperature of between about 1750° F. to about 1900° F. to prevent distortion, wherein controllably heating the turbine part comprises:

heating the turbine part to a first holding temperature of between about 1000° F. to about 1100° F.; and stabilizing the turbine part at the first holding temperature for a predetermined amount of time to facilitate substantially equalizing a temperature of an outer surface and a temperature of an interior region of the turbine part;

recrystallizing the surface damage layer at the peak heat treatment temperature into a fine grain structure to prevent fatigue crack initiation; and controllably cooling the turbine part to prevent distortion.

2. The method in accordance with claim 1 wherein stabilizing the turbine part at the first holding temperature for a predetermined amount of time comprises stabilizing the turbine part at the first holding temperature for a time period of between about 1 hour to about 3 hours.

3. The method in accordance with claim 1 wherein controllably heating the turbine part further comprises:
heating the turbine part to a second holding temperature of about 1500° F. to about 1600° F. at a rate of about 2° F./min. to about 4° F./min.; and
stabilizing the turbine part at the second holding temperature for a time period of about 1 hour to about 3 hours to equalize the temperature of the outer surface and the temperature of the interior region of the turbine part.

4. The method in accordance with claim 3 wherein controllably heating the turbine part further comprises:
heating the turbine part to the peak heat treatment temperature at a rate of about 2° F./min. to about 4° F./min.; and
stabilizing the turbine part at the peak heat treatment temperature for a time period of about 3 hours to about 10 hours.

5. The method in accordance with claim 4 wherein controllably cooling the turbine part further comprises:
cooling the turbine part to a third holding temperature of about 1500° F. to about 1600° F. at a rate of about 15° F./min. to about 30° F./min.; and
stabilizing the turbine part at the third holding temperature for a time period of about two hours to about six hours to equalize the temperature of the outer surface and the temperature of the interior region of the turbine part.

6. The method in accordance with claim 5 wherein controllably cooling the turbine part further comprises cooling the turbine rotor part to a temperature less than about 1000° F. at a rate of about 15° F./min. to about 30° F./min.

7. The method in accordance with claim 6 further comprising:
heating the turbine rotor part at a rate of about 2° F./min. to about 10° F./min. to an aging temperature of about 1300° F. to about 1350° F.;
stabilizing the turbine rotor part at the aging temperature for a period of about eight hours to about twelve hours;
cooling the turbine rotor part at a rate of about 100° F./hr. for a period of about two hours to a fourth holding temperature of about 1125° F. to about 1175° F.; and
stabilizing the turbine rotor part at the fourth holding temperature for a period of about eight hours to about twelve hours.

8. The method in accordance with claim 7 further comprising cooling the turbine rotor part to a room temperature.

9. The method in accordance with claim 1 wherein recrystallizing a surface damage layer further comprises stabilizing the turbine part at the peak heat treatment temperature for a period of about 3 hours to about 10 hours.

10. A turbine rotor disk heat treated according to the method of claim 1.

11. A method for heat treating a serviced turbine rotor disk, said method comprising:
positioning a serviced turbine rotor disk, prior to crack initiation, and including a surface damage layer, in a vacuum furnace configured to prevent surface oxidation, wherein the surface damage layer includes the outermost surface of the serviced turbine rotor disk, and wherein positioning the serviced turbine rotor disk comprises positioning the serviced turbine rotor disk in contact with a support configured to facilitate preventing distortion of the turbine rotor disk;
controlling a heating rate to a peak heat treatment temperature of between about 1750° F. to about 1900° F. to minimize a temperature difference between an outer surface of the serviced turbine rotor disk and an interior region of the serviced turbine rotor disk, wherein controlling a heating rate further comprises stabilizing the serviced turbine rotor disk at a series of intermediate holding temperatures for a time period of about 1 hour to about 3 hours; and
recrystallizing the surface damage layer of the serviced turbine rotor disk at the peak heat treatment temperature.

12. The method in accordance with claim 11 wherein controlling a heating rate further comprises heating the serviced turbine rotor disk at a rate of about 2° F./min. to about 4° F./min.

13. The method in accordance with claim 11 wherein controlling a heating rate further comprises:
heating the serviced turbine rotor disk to a first holding temperature of about 1100° F. at a rate of about 2° F./min. to about 4° F./min.;
stabilizing the serviced turbine rotor disk at the first holding temperature for a time period of about 1 hour to about 3 hours;
heating the serviced turbine rotor disk to a second holding temperature of about 1500° F. at a rate of about 2° F./min. to about 4° F./min.; and
stabilizing the serviced turbine rotor disk at the second holding temperature for a time period of about 1 hour to about 3 hours.

14. The method in accordance with claim 11 wherein positioning the serviced turbine rotor disk in contact with the support further comprises supporting the serviced turbine rotor disk with the support at each of a bore region, a bolt aperture region and a rim region of the serviced turbine rotor disk, wherein the support comprises a material having one of a low thermal expansion and a thermal expansion similar to a thermal expansion of the serviced turbine rotor disk.

15. A method for heat treating a serviced turbine rotor disk, said method comprising:
positioning a serviced turbine rotor disk, prior to crack initiation, and including a surface damage layer, in a vacuum furnace configured to prevent surface oxidation, wherein the surface damage layer includes the outermost surface of the serviced turbine rotor disk, and wherein positioning the serviced turbine rotor disk comprises positioning the serviced turbine rotor disk in contact with a support configured to facilitate preventing distortion of the turbine rotor disk;
heating the serviced turbine rotor disk at a rate of about 2° F./min. to about 4° F./min. to a first holding temperature of about 1100° F.;
stabilizing the serviced turbine rotor disk at the first holding temperature for a period of about 1 hour to about 3 hours;
heating the serviced turbine rotor disk at a rate of about 2° F./min. to about 4° F./min. to a second holding temperature of about 1500° F.;
stabilizing the serviced turbine rotor disk at the second holding temperature for a period of about 1 hour to about 3 hours; and
heating the serviced turbine rotor disk at a rate of about 2° F./min. to about 4° F./min. to a peak heat treatment temperature of about 1750° F. to about 1900° F. to recrystallize the surface damage layer of the serviced turbine rotor disk.

16. The method in accordance with claim 15 further comprising:
- stabilizing the serviced turbine rotor disk at the peak heat treatment temperature for about 3 hours to about 10 hours;
- cooling the serviced turbine rotor disk at a rate of about 15° F./min. to about 30° F./min. to a third holding temperature of about 1500° F. to about 1600° F.;
- stabilizing the serviced turbine rotor disk at the third holding temperature for a period of about two hours to about six hours; and
- cooling the serviced turbine rotor disk at a rate greater than about 300° F./hr. to a temperature less than about 1000° F.

17. The method in accordance with claim 16 further comprising:
- heating the serviced turbine rotor disk at a rate of about 2° F./min. to about 4° F./min. to an aging temperature of about 1300° F. to about 1350° F.;
- stabilizing the serviced turbine rotor disk at the aging temperature for a period of about eight hours to about twelve hours;
- cooling the serviced turbine rotor disk at a rate of about 100° F./hr. to a fourth holding temperature of about 1125° F. to about 1150° F.; and
- stabilizing the serviced turbine rotor disk at the fourth holding temperature for a period of about eight hours to about twelve hours.

18. The method in accordance with claim 17 further comprising cooling the serviced turbine rotor disk to a room temperature.

* * * * *